Figure 1:
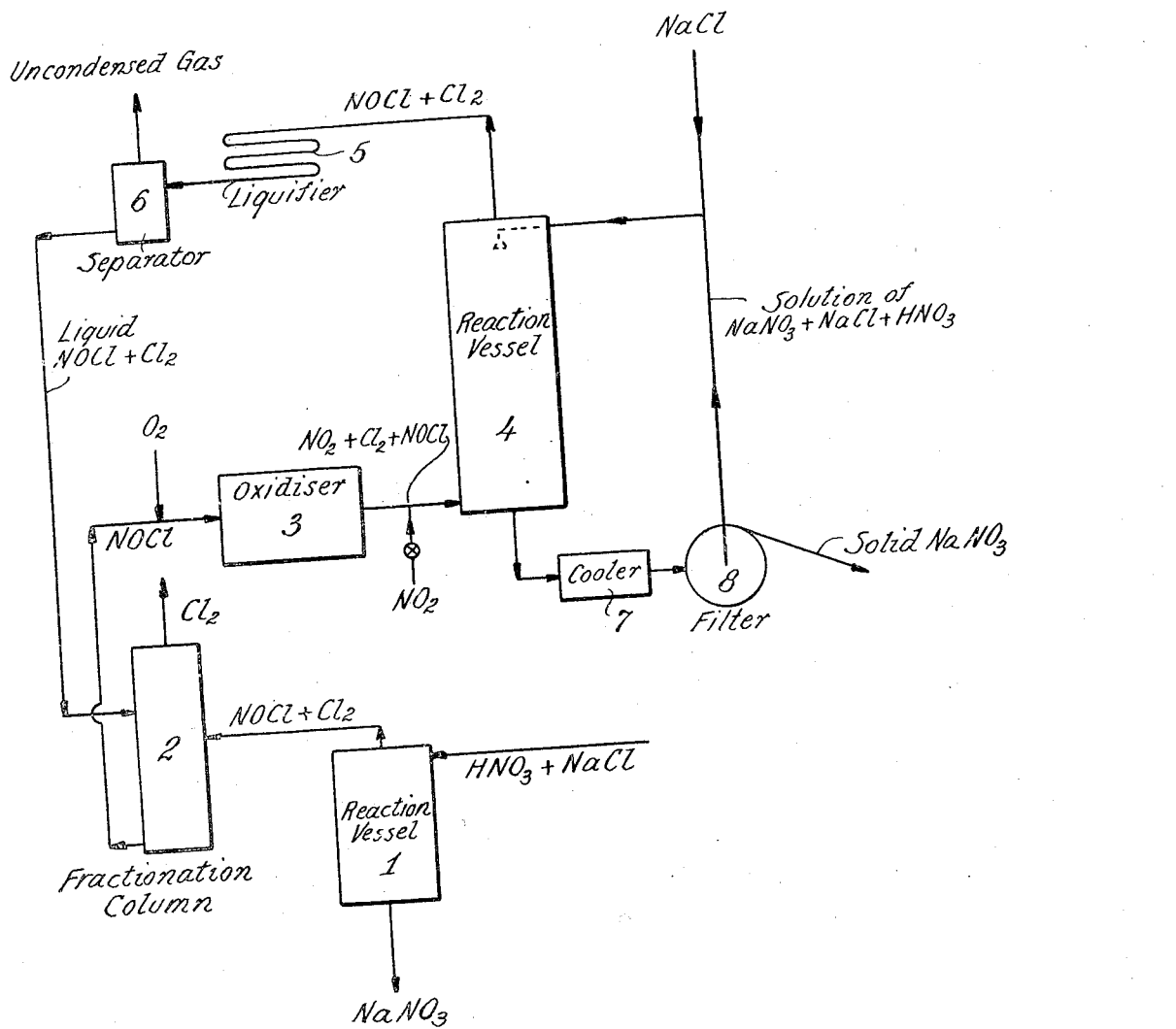

Fig. 2.

Patented Sept. 22, 1942

2,296,762

UNITED STATES PATENT OFFICE 2,296,762

PROCESS FOR THE PRODUCTION OF CHLORINE AND A NITRATE FROM NITROGEN PEROXIDE AND A CHLORIDE

Herman A. Beekhuis, Jr., Petersburg, Va., assignor to The Solvay Process Company, New York, N. Y., a corporation of New York Application December 20, 1938, Serial No. 246,906

9 Claims. (Cl. 23—102)

This invention relates to a process for the production of chlorine and a metal nitrate from nitrogen peroxide and a metal chloride and to a process for the production of chlorine and a metal nitrate by reaction of nitric acid and a metal chloride to form a nitrate, nitrosyl chloride and chlorine, with the nitrosyl chloride being treated to separately recover its chlorine as free chlorine and its nitrogen as metal nitrate.

It is known that chlorine may be produced by reacting nitric acid and a metal chloride, such as sodium or potassium or calcium chloride, with nitric acid to form the corresponding metal nitrate and a gaseous mixture of nitrosyl chloride and chlorine from which the chlorine may be recovered separate from the nitrosyl chloride. It has been recognized that the separate recovery of the nitrogen and chlorine combined as nitrosyl chloride is an important factor in the economic use of that process for the commercial production of chlorine. Accordingly, it has been proposed to decompose the nitrosyl chloride by any one of numerous methods. Among such methods, it has been proposed to decompose the nitrosyl chloride to form nitric oxide and chlorine, oxidize the nitric oxide to nitrogen peroxide and then separate the chlorine from the nitrogen peroxide. The nitrogen peroxide is absorbed in water to form nitric acid which, by again being reacted with a metal chloride, serves to produce additional nitrate and chlorine. By such a process repeated decomposition of the nitrosyl chloride, formation of nitric acid and reaction of the nitric acid with metal chloride serves ultimately to recover as free chlorine and metal nitrate practically all of the chlorine content of the metal chloride and about two-thirds of the fixed nitrogen content of the nitric acid introduced to the process, the other third of this fixed nitrogen representing an excess of nitric acid maintained in the reaction mixture to facilitate a high degree of decomposition of the metal chloride. An objection to such a process is that in reacting the nitric acid and metal chloride the recovery of 1 gram molecule of chlorine requires reacting 3.33 gram atoms of nitrogen with the metal chloride and the production not only of the nitric acid required for this reaction but in addition that required to maintain the excess acid in the reaction mixture needed for complete decomposition of the metal chloride. The nitrosyl chloride formed by the reaction must repeatedly be decomposed to form nitrogen peroxide and chlorine, the nitrogen peroxide converted to nitric acid, and the nitric acid in excess reacted with metal chloride in order to completely recover as utilizable chlorine and nitrate all of the nitrogen and chlorine supplied to the process in the starting materials.

It has also been proposed to react nitrogen peroxide with potassium chloride in an aqueous nitric acid solution to form potassium nitrate and gaseous nitrosyl chloride. Since nitrosyl chloride is not a product used in large quantities commercially, in order to make that process of practical interest it was proposed to recover the fixed nitrogen content of the nitrosyl chloride for reuse in the production of additional metal nitrate. For this purpose the nitrosyl chloride was reacted with metallic iron to convert the iron to ferric chloride and leave a nitrogen oxide gas free from chlorine and its compounds which could be used with oxygen for reaction with additional potassium chloride. Such a process produced no chlorine but only metal nitrate and ferric chloride. The treatment of the nitrosyl chloride was designed to produce from it a nitrogen oxide gas free from chlorine and its compounds which would be suitable for reaction with the potassium chloride, without regard to the production of any chlorine from the potassium chloride supplied to the process.

I have now discovered that a solution of a metal chloride in aqueous nitric acid may be treated with a mixture of gaseous or liquid nitrogen peroxide and nitrosyl chloride and the nitrogen peroxide reacts with the metal chloride to form metal nitrate and evolve gaseous nitrosyl chloride without the presence of nitrosyl chloride in the nitrogen peroxide introduced into contact with the metal chloride solution substantially affecting either the completeness with which the nitrogen peroxide reacts with the metal chloride or the course of the reactions taking place between the nitrogen peroxide and the metal chloride solution. It is known that nitrogen peroxide reacts with water, even in fairly concentrated solutions of nitric acid, to form nitric acid and nitric oxide. It is known that nitrosyl chloride reacts with water to form nitric and hydrochloric acids and that metal chlorides react in aqueous nitric acid solutions to form hydrochloric acid as well as to form nitrosyl chloride and chlorine. I have discovered, however, that under the same conditions under which nitrogen peroxide reacts with a solution of a metal chloride to form nitrosyl chloride, a mixture of nitrogen peroxide and nitrosyl chloride will react in the same way. Although nitrosyl chloride in the absence of the nitrogen peroxide would cause different reactions to take place when passed in contact with the metal chloride solution, in the presence of the nitrogen peroxide I have found it to be substantially inert even though it be the sole gaseous product of the desired reaction of the nitrogen peroxide and metal chloride and hence would be expected to materially affect the degree of the completeness of reaction as well as to affect the course of the reaction because of its known reactions with water.

I have devised, therefore, a process for the production both of chlorine and of a metal nitrate from nitrogen peroxide and a metal chloride whereby all of the nitrogen content of the nitrogen peroxide may be converted into metal nitrate and all of the chlorine content of the metal chloride may be recovered as free chlorine. This process comprises the oxidation of nitrosyl chloride to form nitrogen peroxide and chlorine with the chlorine being recovered as one of the products of the process and the nitrogen peroxide returned for reaction to form additional metal nitrate. The process lends itself, therefore, to the economic treatment of the nitrosyl chloride evolved by the reaction of nitric acid and a metal nitrate to separately recover the nitrogen and chlorine as metal nitrate and free chlorine by oxidizing the nitrosyl chloride and utilizing the nitrogen peroxide which may thus be obtained for reaction with the metal chloride. It is thereby unnecessary to convert the nitrogen peroxide into nitric acid for reaction with the metal chloride, as in processes heretofore proposed. Further, without recovering and reutilizing the excess nitric acid used in decomposing metal chloride, about 11% less nitric acid is required for the production of a given amount of chlorine than in a process in which the nitrosyl chloride is oxidized and its nitrogen content converted into nitric acid which is reprocessed for reaction with metal chloride.

In carrying out the preferred form of my invention, nitric acid and an alkali metal or alkaline earth metal chloride, such as sodium, potassium or calcium chloride, are reacted to form a solution of the corresponding metal nitrate and a gas mixture of nitrosyl chloride and chlorine. The nitrosyl chloride, either with or without first separating it from the chlorine, is partially oxidized to form a mixture of nitrogen peroxide, chlorine and nitrosyl chloride. Separation of the nitrosyl chloride from the chlorine is preferably accomplished by condensing the two gases and distilling with fractionation the liquid condensate. The oxidation of the nitrosyl chloride is preferably accomplished by mixing it with an oxygen gas, such as air or oxygen, and heating the mixture, preferably in the presence of a catalyst promoting the oxidation of the nitrosyl chloride. Reaction of the nitrosyl chloride and oxygen is at best incomplete so that, as pointed out above, the nitrosyl chloride is but partially oxidized. Nitrogen peroxide and undecomposed nitrosyl chloride in the nitrosyl chloride oxidation products are then contacted with a metal chloride solution in nitric acid, either with or without first separating chlorine from the nitrogen peroxide and undecomposed nitrosyl chloride, and the nitrogen peroxide reacted with the metal chloride to form metal nitrate and nitrosyl chloride. Gaseous products of the oxidation preferably are cooled to condense a liquid mixture of nitrogen peroxide, chlorine and nitrosyl chloride. This liquid mixture is then fractionally distilled to evolve a substantially pure chlorine gas and leave a residue of nitrogen peroxide and nitrosyl chloride. The residue, either as a liquor or after being vaporized, is reacted with a solution of a metal chloride in aqueous nitric acid to form the corresponding metal nitrate and evolve nitrosyl chloride gas. The metal chloride may be supplied to the reaction mixture in amount in excess of that which will dissolve in the nitric acid and the product of the reaction with the nitrogen peroxide may be a solution or slurry of metal nitrate. The metal nitrate may be recovered from solution by cooling to crystallize the salt and filtering it from the mother liquor. Or, if a slurry of metal nitrate is formed, the slurry may be filtered without cooling. In either case, the mother liquor is returned for addition of metal chloride and treatment with the nitrogen peroxide-nitrosyl chloride mixture to form additional nitrate and nitrosyl chloride.

The nitrosyl chloride evolved from the reaction mixture may be introduced into that formed by reaction of the nitric acid and metal nitrate and the nitrosyl chloride from both sources treated together to partially oxidize it to form the nitrogen peroxide-chlorine-nitrosyl chloride mixture from which the chlorine is recovered and the nitrogen peroxide and nitrosyl chloride is used for the treatment of the metal chloride to produce metal nitrate. All of the nitrosyl chloride thus obtained by the reaction of nitric acid and metal nitrate may thus be converted into metal nitrate and free chlorine equivalent in amount both to that contained in the nitrosyl chloride and that contained in the metal chloride used for reaction with the nitrogen peroxide.

While the process of this invention is of importance as a means for the production of chlorine from nitric acid and a metal chloride, the invention is not limited thereto. It is suitable for producing chlorine and a metal nitrate from nitrosyl chloride or from nitrogen peroxide from whatever source these materials may be obtained. For example, the invention comprises a process in which nitrogen peroxide is reacted with a nitric acid solution of metal chloride to form the metal nitrate and evolve gaseous nitrosyl chloride. The nitrosyl chloride is then partially oxidized to nitrogen peroxide and chlorine and the chlorine separated from the nitrogen peroxide and residual unoxidized nitrosyl chloride. The mixture of nitrogen peroxide and nitrosyl chloride thus formed is contacted with the metal nitrate solution together with additional nitrogen peroxide supplied to the process, to react the nitrogen peroxide with the metal chlorine. Metal nitrate and chlorine may be produced in this way from nitrogen peroxide and a metal chloride instead of first absorbing the nitrogen peroxide in water to form nitric acid and then reacting the nitric acid with metal chloride.

Figure 2:
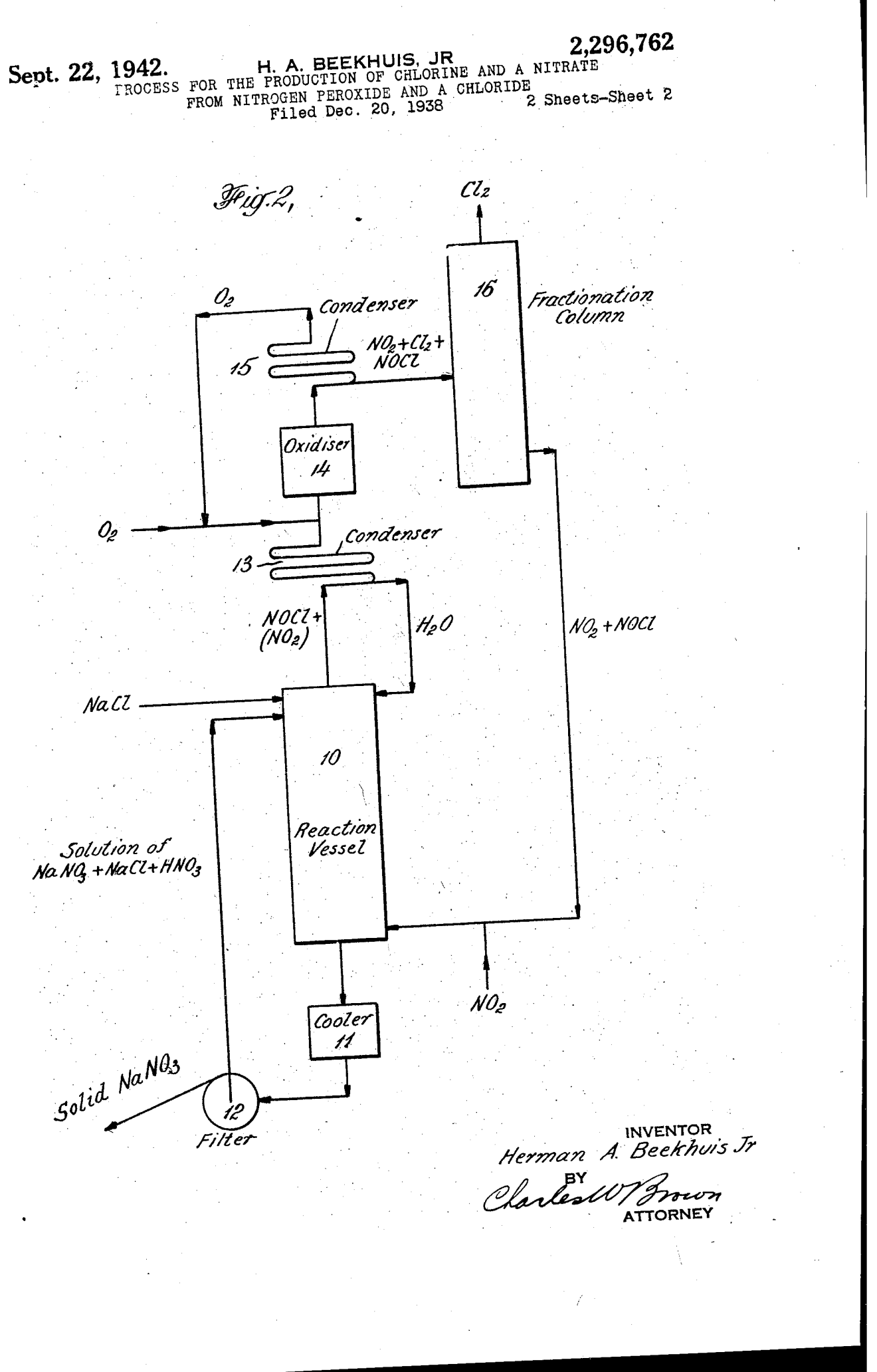

The invention will be more particularly described by the following examples, the processes of which are diagrammatically illustrated in Figs. 1 and 2. Both examples and corresponding figures illustrate processes for the production of chlorine and sodium nitrate, Example 1 and Fig. 1 from sodium chloride and nitric acid, and Example 2 and Fig. 2 from sodium chloride and nitrogen peroxide.

*Example 1.*—Nitric acid and sodium chloride are reacted in a reaction vessel 1 in well known manner to form a solution of sodium nitrate and evolve a mixture of nitrosyl chloride and chlorine. This gaseous mixture is introduced into a fractionation column 2 where the nitrosyl chloride is liquefied and the chlorine is separated therefrom as a relatively pure chlorine gas which leaves the top of column 2. The liquid nitrosyl chloride is withdrawn from the bottom of column 2 and, after being gasified, is mixed with oxygen and heated in an oxidizer 3 to partially oxidize the nitrosyl chloride. The gaseous oxidation products contain nitrogen peroxide, chlorine and nitrosyl chloride in the proportions of 0.2 part or more residual undecomposed nitrosyl chloride for every 1 part by weight of nitrogen peroxide. This gas from oxidizer 3 is passed in a reaction vessel 4 in counter-current contact with a solution of sodium chloride in aqueous nitric acid introduced to the top of the vessel. The gas and liquid are contacted with each other at about 60° C. in proportions such that the chlorine of the sodium chloride in the solution is evolved substantially wholly as nitrosyl chloride which escapes from the top of vessel 4 together with the chlorine and nitrosyl chloride in the gas entering the vessel. This mixture of nitrosyl chloride and chlorine leaving vessel 4 is passed to a liquefier 5 where the nitrosyl chloride and chlorine are liquefied and are separated from any uncondensed gas in a separator 6. From separator 6 the liquid mixture of nitrosyl chloride and chlorine is introduced into the upper portion of fractionation column 2 where the chlorine formed by oxidation of nitrosyl chloride in oxidizer 3 is separated from the nitrosyl chloride and recovered along with the chlorine formed by reaction of the nitric acid and sodium chloride. The nitrosyl chloride formed in reaction vessel 4 returns from the bottom of column 2 for oxidation in oxidizer 3.

A solution of sodium nitrate in nitric acid is drawn from the bottom of reaction vessel 4 and is cooled in a cooler 7 to crystallize sodium nitrate. The crystallized nitrate is separated from the mother liquor in a filter 8 and the mother liquor returns with addition of sodium chloride for contact with the gas passed through reaction vessel 4.

If desired, nitrogen peroxide from an outside source may be introduced into the gases passed into reaction vessel 4. In this case the ratio of nitrosyl chloride to nitrogen peroxide in the gas contacted with the sodium chloride solution will be decreased below that in the oxidation gases leaving oxidizer 3. In carrying out the process of this invention the proportion of nitrosyl chloride to nitrogen peroxide in the gases contacted with the metal chloride solution may be in the range of 0.1 part or more of nitrosyl chloride to every 1 part by weight of nitrogen peroxide.

*Example 2.*—With reference to Fig. 2, the numeral 10 designates a reaction vessel or tower through which a solution containing 40% HNO₃, 10% NaNO₃, 5% NaCl and the remainder water is passed at a temperature of about 60° C. A mixture of gaseous nitrogen peroxide and nitrosyl chloride is introduced into the bottom of reaction vessel 10 and contacted with the solution therein. The nitrogen peroxide reacts with the sodium chloride to form a solution of sodium nitrate which is cooled in a cooler 11 to crystallize sodium nitrate therefrom. The crystallized nitrate is separated from the mother liquor in a filter 12 and the mother liquor is returned to reaction vessel 10. By thus cooling to 30° C. about 1100 parts by weight of the solution drawn from reaction vessel 10, about 85 parts of sodium nitrate are crystallized from the solution and recovered as the solid salt in filter 12. The mother liquor is returned to vessel 10 together with 58.5 parts of solid sodium chloride, thereby maintaining the desired composition, given above, of the solution with which the nitrogen peroxide is reacted.

Nitrosyl chloride gas is evolved from the reaction mixture in vessel 10 and passes through a condenser 13 in which it is cooled to 0° C. to condense moisture from the gas and dry it. The condensed moisture is returned to the solution in reaction vessel 10.

The dried nitrosyl chloride is mixed with oxygen in the proportion of 1 volume of oxygen for every 2 volumes of nitrosyl chloride. This mixture is then passed through an oxidizer 14 in which it is contacted at an elevated temperature with a catalyst promoting the reaction of the oxygen and nitrosyl chloride to form nitrogen peroxide and chlorine. The gaseous products of this oxidation pass to a condenser 15 in which they are cooled to −50° C. to liquefy the nitrogen peroxide, chlorine and residual unoxidized nitrosyl chloride. The uncondensed oxygen gas is returned and mixed with additional nitrosyl chloride gas to be treated in oxidizer 14. A mixture of liquefied nitrogen peroxide, chlorine and nitrosyl chloride is drawn from condenser 15 and introduced into a fractionation column 16 in which it is distilled and fractionated to separate the chlorine from the mixture. The chlorine is thus recovered as one of the products of the process. The nitrogen peroxide and nitrosyl chloride are withdrawn from the lower portion of fractionation column 16 in the form of a gaseous mixture containing about 26% by weight nitrosyl chloride. This gaseous mixture, after the introduction of additional nitrogen peroxide from an outside source, serves as the nitrogen peroxide-nitrosyl chloride mixture introduced into contact with the sodium chloride in reaction vessel 10.

Numerous changes and modifications may be made in the processes described above without departing from the scope of my invention. The reaction of gaseous nitrogen peroxide and metal chloride to form nitrosyl chloride and metal nitrate is exothermic and an increase in temperature at which the reaction is carried out lowers the degree of conversion of the nitrogen peroxide contacted with the chloride solution. In general, therefore, the reaction should be carried out at temperatures below 100° C. and preferably at temperatures not above about 60° C. The sodium chloride solution with which the nitrogen peroxide is reacted may contain the sodium chloride in widely varying concentrations and, if desired, it may contain solid undissolved sodium chloride which, as sodium chloride reacts with the nitrogen peroxide, serves to maintain the solution saturated with sodium chloride. The sodium nitrate may crystallize as solid sodium nitrate from the solution containing solid sodium chloride and by continuing to treat the mixture of solids and solution with nitrogen peroxide until all of the solid chloride has been dissolved, a relatively pure nitrate may be filtered from the mother liquor. Even with nitrate crystallizing from a solution in the presence of solid chloride, it has been found that the decomposition of the chloride or the purity of the crystallized nitrate is not deleteriously affected. The nitrate appears to crystallize separately from the solid chloride present, rather than on the chloride and thereby preventing the solid chloride from going into solution and reacting with the nitrogen peroxide.

The chloride solution with which the nitrogen peroxide reacts must contain an appropriate amount of nitric acid in order that the nitrogen peroxide may react with the chloride to form nitrosyl chloride rather than to form nitric acid and evolve nitric oxide or hydrochloric acid. The amount of nitric acid required for this purpose will vary according to the temperature of the solution and partial pressure of nitrogen peroxide in the mixture of nitrogen peroxide and nitrosyl chloride introduced into contact with the solution. In a cyclic system in which mother liquor is circulated with the introduction of solid sodium chloride, reaction with nitrogen peroxide and separation of solid sodium nitrate from the solution, the circulating solution comes to equilibrium with the reacting mixture of nitrogen peroxide and nitrosyl chloride under the particular conditions maintained in carrying out the process. It is not necessary, therefore, to start initially with a solution of sodium chloride in nitric acid of any given composition. Instead, the requisite acid may be formed in an inital solution of metal chloride in water by reaction with nitrogen peroxide first passed in contact with the solution and, when the acid concentration has reached equilibrium with the mixture of nitrogen peroxide and nitrosyl chloride, complete utilization of the nitrogen peroxide to form nitrosyl chloride and nitrate is thereafter obtained.

The proportions of nitrogen peroxide and nitrosyl chloride introduced into contact with the solution of metal nitrate in carrying out the processes of this invention may vary widely. When a mixture of gaseous nitrosyl chloride and oxygen is treated to oxidize the nitrosyl chloride the oxidation product will generally contain 0.2 part or more nitrosyl chloride to every 1 part of nitrogen peroxide by weight. All such mixtures are suitable for introduction into contact with a metal chloride solution for reaction to form metal nitrate and nitrosyl chloride in accordance with the process of this invention. When nitrogen peroxide is added to such a mixture of nitrogen peroxide and nitrosyl chloride obtained by oxidation of nitrosyl chloride, or when other methods of oxidizing the nitrosyl chloride are used, the ratio of nitrosyl chloride to nitrogen peroxide in the gas or liquid used for reaction with the salt solution in accordance with the process of this invention may be decreased to 0.1 part or more nitrosyl chloride for every 1 part nitrogen peroxide.

I claim:

1. The process for the production of a metal nitrate and chlorine which comprises partially oxidizing nitrosyl chloride to form a mixture of nitrogen peroxide, chlorine and residual unoxidized nitrosyl chloride, introducing nitrogen peroxide thus obtained mixed with nitrosyl chloride in the proportions of 0.1 part or more NOCl to every 1 part $NO_2$ by weight into contact with a solution of a metal chloride in aqueous nitric acid and reacting the major proportion of said nitrogen peroxide with the metal chloride in said solution under conditions resulting in the formation of metal nitrate with chlorine being evolved from the metal chloride substantially only as nitrosyl chloride.

2. The process for the production of a metal nitrate and chlorine which comprises contacting nitrogen peroxide with a solution of a metal chloride in aqueous nitric acid and reacting said nitrogen peroxide substantially only with the metal chloride in said solution to form a metal nitrate and to evolve chlorine substantially only as nitrosyl chloride, separating from the solution thus formed nitrosyl chloride, partially oxidizing said nitrosyl chloride to form a mixture of nitrogen peroxide, chlorine and residual unoxidized nitrosyl chloride, separating the chlorine from the nitrogen peroxide and returning the nitrogen peroxide thus obtained and additional nitrogen peroxide together with unoxidized nitrosyl chloride in the proportions of 0.1 part or more NOCl to every 1 part $NO_2$ by weight into contact with said solution of metal chloride to form additional metal nitrate and nitrosyl chloride by reaction of the nitrogen peroxide with the metal chloride in said solution under conditions resulting in the chlorine being evolved from the metal chloride substantially only as nitrosyl chloride.

3. The process for the production of a metal nitrate and chlorine which comprises contacting nitrogen peroxide with a solution of a metal chloride in aqueous nitric acid and reacting the nitrogen peroxide principally with the metal chloride in said solution thereby forming a metal nitrate and nitrosyl chloride, separating thus formed nitrosyl chloride as a gas from the solution, cooling the gaseous nitrosyl chloride to condense water vapor therefrom and to dry it, mixing the dried nitrosyl chloride with an oxygen gas, partially oxidizing the nitrosyl chloride by reaction with said oxygen gas to form a mixture of nitrogen peroxide, chlorine and residual unoxidized nitrosyl chloride containing 0.2 part or more NOCl for every 1 part $NO_2$ by weight and returning the nitrogen peroxide and nitrosyl chloride thus obtained into contact with said solution of metal chloride and reacting the nitrogen peroxide with the metal chloride under conditions resulting in the formation of metal nitrate and evolution of chlorine from the metal chloride solution substantially only as nitrosyl chloride.

4. The process for the production of a metal nitrate and chlorine which comprises continuously circulating nitrosyl chloride in a circulatory system and in that system partially oxidizing the nitrosyl chloride to form a mixture of nitrogen peroxide, chlorine and undecomposed nitrosyl chloride, passing the nitrogen peroxide and nitrosyl chloride thus obtained in the proportions of 0.1 part or more NOCl for every 1 part $NO_2$, by weight in direct contact with a solution of a metal chloride in aqueous nitric acid and reacting the nitrogen peroxide with the metal chloride under conditions resulting in the formation of metal nitrate and evolution of chlorine from the metal chloride solution substantially only as nitrosyl chloride, circulating in said system nitrosyl chloride evolved from said solution, continuously supplying to said circulatory system a nitrogen compound from the group consisting of nitrosyl chloride and nitrogen peroxide to replace fixed nitrogen converted therein into metal nitrate, separating chlorine from the nitrosyl chloride and nitrogen peroxide circulating in said circulatory system and withdrawing the separated chlorine from that system, withdrawing solution of metal nitrate from said circulatory system, separating solid nitrate from the withdrawn solution and introducing the mother liquor containing nitric acid from which solid nitrate has been separated together with additional metal chloride into contact in said circulatory system with the mixture of nitrogen peroxide and nitrosyl chloride circulating therein.

5. The process for the production of a metal nitrate and chlorine which comprises mixing nitrosyl chloride with an oxygen gas, partially oxidizing the nitrosyl chloride by reaction with said oxygen gas to form a mixture of nitrogen peroxide, chlorine and residual unoxidized nitrosyl chloride, separately recovering from said mixture chlorine and a mixture of nitrogen peroxide and nitrosyl chloride in the proportions of 0.1 part or more NOCl for every 1 part NO$_2$, by weight, introducing the mixture of nitrogen peroxide and nitrosyl chloride thus obtained into contact with a solution of a metal chloride in aqueous nitric acid and reacting the nitrogen peroxide substantially only with the metal chloride in said solution under conditions resulting in the formation of metal nitrate and evolution of chlorine from the metal chloride solution substantially only as nitrosyl chloride.

6. In a process for the production of a metal nitrate and chlorine by reaction of nitrogen peroxide and a solution of a metal chloride in aqueous nitric acid that improvement which comprises introducing into contact with said solution a mixture of nitrogen peroxide and nitrosyl chloride containing 0.1 part or more NOCl for every 1 part NO$_2$ by weight and reacting said nitrogen peroxide substantially only with the metal chloride in said solution to form a metal nitrate and evolve the chlorine in the metal chloride substantially only as nitrosyl chloride.

7. The process for the production of chlorine and a metal nitrate which comprises reacting a metal chloride with nitric acid to form metal nitrate and a gaseous mixture of nitrosyl chloride and chlorine, introducing said nitrosyl chloride into a circulatory system in which nitrosyl chloride is continuously circulated and in that system partially oxidizing the nitrosyl chloride circulated therein to form nitrogen peroxide and chlorine and to leave a portion of the nitrosyl chloride undecomposed, introducing a mixture of said nitrogen peroxide and undecomposed nitrosyl chloride containing 0.2 or more parts for every 1 part NO$_2$ by weight into direct contact with a solution of a metal chloride in aqueous nitric acid and reacting the nitrogen peroxide with the metal chloride in said solution to form metal nitrate and evolve the chlorine from the metal chloride substantially only as nitrosyl chloride gas which is recirculated in said system and recovering as a product of said process both the chlorine formed by reaction of said metal chloride and nitric acid and the chlorine formed by oxidation of nitrosyl chloride.

8. The process for the production of a metal nitrate and chlorine which comprises partially oxidizing nitrosyl chloride to form a mixture of nitrogen peroxide, chlorine and residual unoxidized nitrosyl chloride, introducing nitrogen peroxide thus obtained mixed with nitrosyl chloride in the proportions of 0.1 part or more NOCl to every 1 part NO$_2$ by weight into contact with a solution of a metal chloride in aqueous nitric acid, reacting the major proportion of said nitrogen peroxide with the metal chloride in said solution under conditions resulting in the formation of metal nitrate with chlorine being evolved from the metal chloride substantially only as nitrosyl chloride and further converting nitrogen and chlorine in the nitrosyl chloride leaving contact with said solution by partially oxidizing the last mentioned nitrosyl chloride to form a mixture of nitrogen peroxide, chlorine and residual unoxidized nitrosyl chloride containing 0.1 part or more NOCl for every 1 part NO$_2$ by weight and passing the last mentioned mixture in contact with solution of metal chloride in aqueous nitric acid and reacting the major proportion of the nitrogen peroxide in the mixture with the metal chloride in the solution to form metal nitrate and evolve chlorine from the metal chloride substantially only as nitrosyl chloride.

9. The process for the production of a metal nitrate and chlorine which comprises continuously circulating nitrosyl chloride in a circulatory system and in that system partially oxidizing the nitrosyl chloride to form a mixture of nitrogen peroxide, chlorine and undecomposed nitrosyl chloride, passing the nitrogen peroxide and nitrosyl chloride thus obtained in the proportions of 0.1 part or more NOCl for every 1 part NO$_2$, by weight, in direct contact with a solution of a metal chloride in aqueous nitric acid and reacting the nitrogen peroxide with the metal chloride under conditions resulting in the formation of metal nitrate and evolution of chlorine from the metal chloride solution substantially only as nitrosyl chloride, recirculating in said system nitrosyl chloride evolved from said solution, continuously supplying to said circulatory system a nitrogen compound from the group consisting of nitrosyl chloride and nitrogen peroxide to replace fixed nitrogen converted therein into metal nitrate, and separating chlorine from the nitrosyl chloride and nitrogen peroxide circulating in said circulatory system and withdrawing the separated chlorine from that system.

HERMAN A. BEEKHUIS, JR.